United States Patent [19]
Wong

[11] Patent Number: 5,954,790
[45] Date of Patent: Sep. 21, 1999

[54] METHOD AND APPARATUS FOR PARALLEL PREDICTION AND COMPUTATION OF MASSIVE CANCELLATION IN FLOATING POINT SUBTRACTION

[75] Inventor: Roney S. Wong, Sunnyvale, Calif.

[73] Assignee: Samsung Electronics Company, Ltd., Seoul, Rep. of Korea

[21] Appl. No.: 08/733,707

[22] Filed: Oct. 17, 1996

[51] Int. Cl.[6] .................................................. G06F 7/38
[52] U.S. Cl. ............................................................ 708/505
[58] Field of Search ...................... 364/715.011, 715.03, 364/715.04, 715.08, 748.01, 748.11, 751, 761, 768, 769

[56] References Cited

U.S. PATENT DOCUMENTS

| | | | |
|---|---|---|---|
| 5,063,530 | 11/1991 | Ishikawa | 364/748.11 |
| 5,086,405 | 2/1992 | Chung et al. | 364/748.11 |
| 5,337,265 | 8/1994 | Desvosiers et al. | 364/748.11 |
| 5,369,607 | 11/1994 | Okamoto | 364/715.04 |
| 5,677,861 | 10/1997 | Inoue et al. | 364/748.11 |
| 5,684,729 | 11/1997 | Yamada et al. | 364/715.04 |

OTHER PUBLICATIONS

Hennessy & Patterson, "Computer Architecture: A Quantitative Approach", Morgan Kaufmann Publishers, Inc., San Mateo Ca, 1990, pp. A–18 to A–19.

Primary Examiner—Emmanuel L. Moise
Attorney, Agent, or Firm—Skjerven, Morrill, MacPherson, Franklin & Friel LLP

[57] ABSTRACT

A floating point subtraction is performed on a first and second floating point number to obtain an exponent result and a fraction result, the first floating point number has a first exponent and a first fraction and the second floating point number has a second exponent and a second fraction. A first adder determines an exponent difference between the first and second exponents and, concurrently with determining the exponent difference, a prediction circuit predicts a massive cancellation prediction and a second adder determines the difference between the first and second fraction and generates a massive cancellation fraction result. Then it is determined whether the massive cancellation result is valid and if so, the massive cancellation fraction result is selected as a basis for the fraction result. If not, a result from the no massive cancellation path is selected as the basis for the fraction result.

18 Claims, 11 Drawing Sheets

METHOD AND APPARATUS FOR PARALLEL PREDICTION AND COMPUTATION OF MASSIVE CANCELLATION IN FLOATING POINT SUBTRACTION

BACKGROUND OF THE INVENTION

1. Field of the Invention

This invention relates to floating point arithmetic and more particularly to floating point subtraction operations.

2. Description of the Related Art

Floating point subtraction is utilized in numerous applications. Such floating point numbers are typically in the form of $1.f \times 2^E$, where 1.f is the significand, f is a fraction and E is an exponent. The floating point numbers discussed herein, by way of example, are assumed to be represented in IEEE 754 single precision format, where the exponent field is eight bits and the fraction field is twenty three bits. The one in the significand is not explicitly represented in the IEEE format. The floating point representation in IEEE 754 format includes a sign bit.

Subtracting two floating point numbers A−B, where for example, $A=(1.101 \times 2^3)$ and $B=(1.100 \times 2^1)$ requires adjusting B to be in the form of $(0.011 \times 2^3)$ prior to the fractions being added so that the exponents of the two numbers are equal. That general approach to floating point subtraction is known in the art and is illustrated in FIG. 1.

Given two floating point numbers A and B, the first step 10 is to compare the exponents of A (expA) and B (expB). If the exponent of A is less than B (step 12), then the fractions of A and B are swapped in step 14 so that the exponent of A is always greater than or equal to the exponent of B. The larger exponent is chosen as the exponent of the result. In step 16, with expB less than or equal to expA, the fraction of B is shifted to the right by the absolute value of the difference between the expA and expB. In step 18 the fraction of B is subtracted from the fraction of A. In step 20, the result of the fractional subtraction is shifted to the left, if necessary, to normalize the result. The exponent is adjusted according to the amount of normalization required.

Note that the shifting operation in step 16 requires at most a one bit shift if $|ExpA-ExpB| \leq 1$. In that case, the shifting operation in step 20 might require a large shift to normalize the result, since there are potentially a significant number of leading 0's in the subtraction of the fraction of A (FrcA)— the fraction of B (FrcB). That is due to the operands having exponents which differ by 1 or less. Conversely, if $|ExpA-ExpB|>1$, multiple bit shifting may be required in step 14 to equalize the exponents but there is at most a single bit shift in step 18.

A block diagram of a floating point adder which implements the method described in FIG. 1, is shown in FIG. 2. Operands 201 and 202 are being added. Small adder 203 compares the exponents of the operands. Small adder 203 is so named since the exponents are only eight bits whereas the fractions are 23 bits. The exponent difference is placed in register 204. That exponent difference is provided to control logic 211. Selector 212 selects the larger exponent as the preliminary result exponent and provides the result to incrementer/decrementer 210.

The fractions of operands 201 and 202 are supplied through multiplexers 205 and 206 to the right shifter 208. The multiplexers 205 and 206 are under control of control logic 211 to supply the fraction of the operand with the smaller exponent to right shifter 208. The difference between the exponents determines the amount to right shift (if at all). The right shifted fraction in multiplexer 208 and the fraction from 205 are supplied to big adder 207. Big adder 207 is so named because the size of the fraction operands are typically large. Following the subtraction operation, the result may need to be shifted in shifter 209. If the result from big adder 207 is shifted to normalize, the exponent is decremented accordingly. Finally, rounding hardware 213 performs the appropriate rounding operations defined, e.g., in IEEE 754 standard and provides the result 215.

As discussed with relation to FIG. 1, the subtract operation will only require a right shift in shifter 208 or 209, excluding, one bit shifts, but not both. It has been recognized that an adder that can exploit this advantage by reducing the number of steps required to FIG. 1 by eliminating the unnecessary shift. It has also been recognized that a pipelined adder can duplicate the shifter and adder to take advantage of the fact that only one major shift operation is necessary. Such proposals however, still require the completion of step 10, the exponent compare, prior to a subtraction or shift. It would therefore be advantageous to provide a floating point adder that more fully exploits the fact that only one large shift operation is required and thus further speed up floating point subtratction.

SUMMARY OF THE INVENTION

Therefore, it has been discovered to provide a more efficient floating point adder that better exploits the fact that large shifts are required only once in a floating, point addition. The invention provides a method and apparatus to perform floating point subtraction on first and second floating point numbers to obtain an exponent result and a fraction result. The first floating point number has a first exponent and a first fraction and the second floating point number has a second exponent and a second fraction. The method determines an exponent difference between the first and second exponent in a first adder and, concurrently with determining the exponent difference, determines a massive cancellation prediction in a prediction circuit and determines the difference between the first and second fractions in a second adder according to the massive cancellation prediction, and generates a massive cancellation fraction result. It is determined whether the massive cancellation result is valid and the massive cancellation fraction result is selected as a basis for the fraction result if the massive cancellation result is determined valid.

An apparatus which implements the method of the instant invention performs a floating point subtraction on first and second numbers. The first and second numbers respectively include a first and second exponent and a first and second fraction. The apparatus comprises a first adder which receives the first and second exponents and outputs an exponent difference. The apparatus further includes a massive cancellation path, the massive cancellation path includes a massive cancellation prediction circuit, coupled to predetermined bits of the first and second numbers, which outputs a massive cancellation prediction indication, a second adder circuit coupled to the prediction circuit and to the first and second fractions in accordance with the prediction circuit. The second adder subtracts the first and second fractions according to the prediction indication and outputs a massive cancellation fraction result. The massive cancellation path further includes a massive cancellation determination circuit, which outputs a massive cancellation signal indicating if a massive cancellation path result is valid. The apparatus also includes a no massive cancellation path, the no massive cancellation path including a shifter which receives one of the first and second fractions and outputs a shifted fraction in accordance with the exponent difference and a third adder circuit coupled to the shifter and an unshifted fraction which outputs a no massive cancellation path result. The apparatus also includes a selector circuit that selects one of the no massive cancellation path result and the massive cancellation path result according to the massive cancellation signal.

BRIEF DESCRIPTION OF THE DRAWINGS

The present invention may be better understood, and its numerous objects, features, and advantages made apparent to those skilled in the art by reference to the accompanying drawings, in which the use of the same reference symbols in different drawings indicates similar or identical items.

DESCRIPTION OF THE PREFERRED EMBODIMENT(S)

In floating point add or subtract operations, the exponents involved may be equal, differ by 1, or differ by more than one. Where the exponents are equal or differ by only one, it is possible for the numbers to be close in value such that the subtraction results in massive cancellations (MC). That is, the result contains one or more 0's in the significand. In such cases the first shift will require at most a one bit shift and a shift after the subtraction will be required to normalize the result. When the exponents differ by more than one, massive cancellations are not possible and a right shift before the subtraction of the fractions will be necessary to equalize the exponents. Table 1 shows the cases in floating point addition/subtraction operations where massive cancellations (MC) can occur and where no massive cancellations (NMC) can occur.

TABLE 1

| |ExpA-ExpB| | Operation | Cancellation |
|---|---|---|
| 0 | Add | NMC |
| 0 | Sub | NMC/MC |
| 1 | Add | NMC |
| 1 | Sub | NMC/MC |
| >1 | Add | NMC |
| >1 | Sub | NMC |

As can be seen in Table 1, the only times when MC can occur is when |ExpA-ExpB|=0 or 1 and there is a subtract operation. A subtract operation includes a subtract operation where the signs of the operands are equal and an addition operation where the signs of the operands are different. Table 1 indicates that when |ExpA-ExpB|=0 or 1 and there is a subtract operation, that MC may occur but also that NMC may occur.

Figure 1:
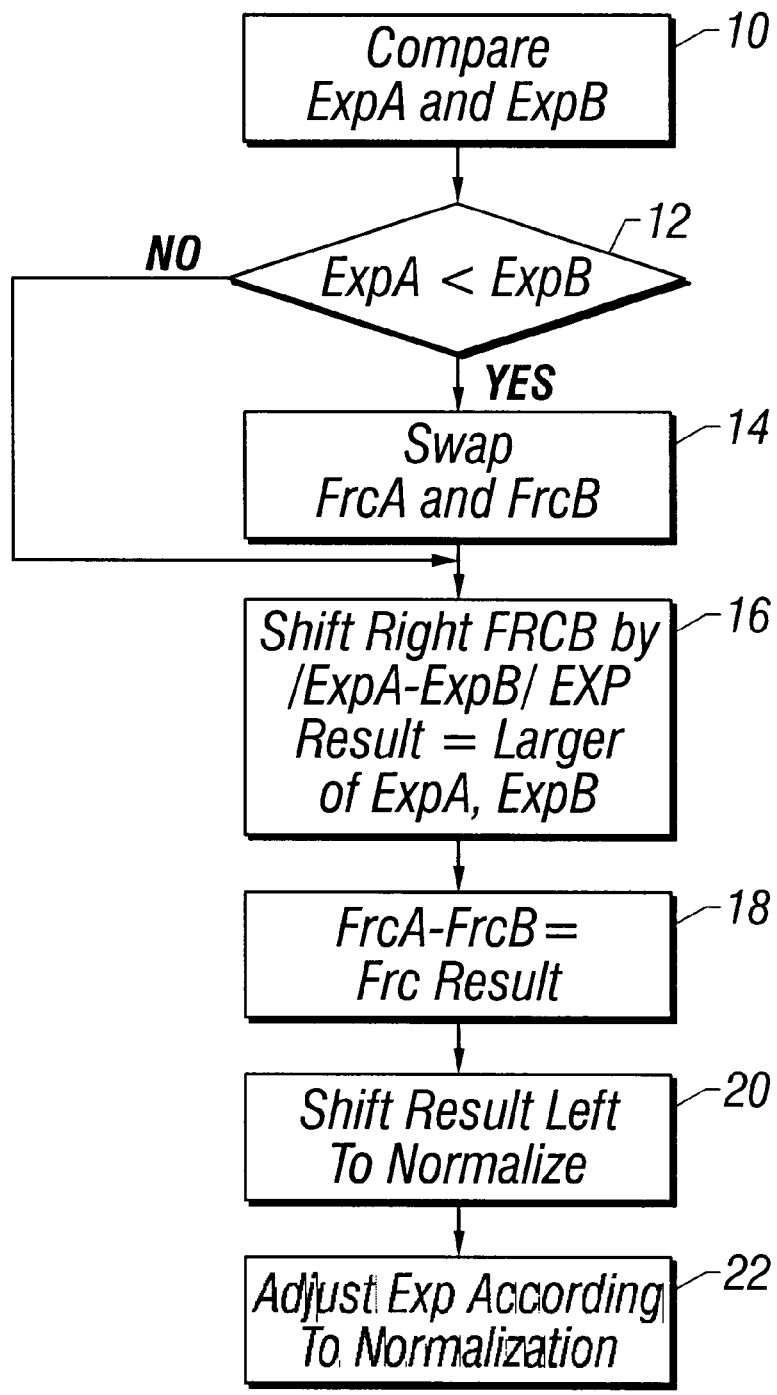
FIG. 1 shows the steps of a prior art floating point add operation.
Figure 2:
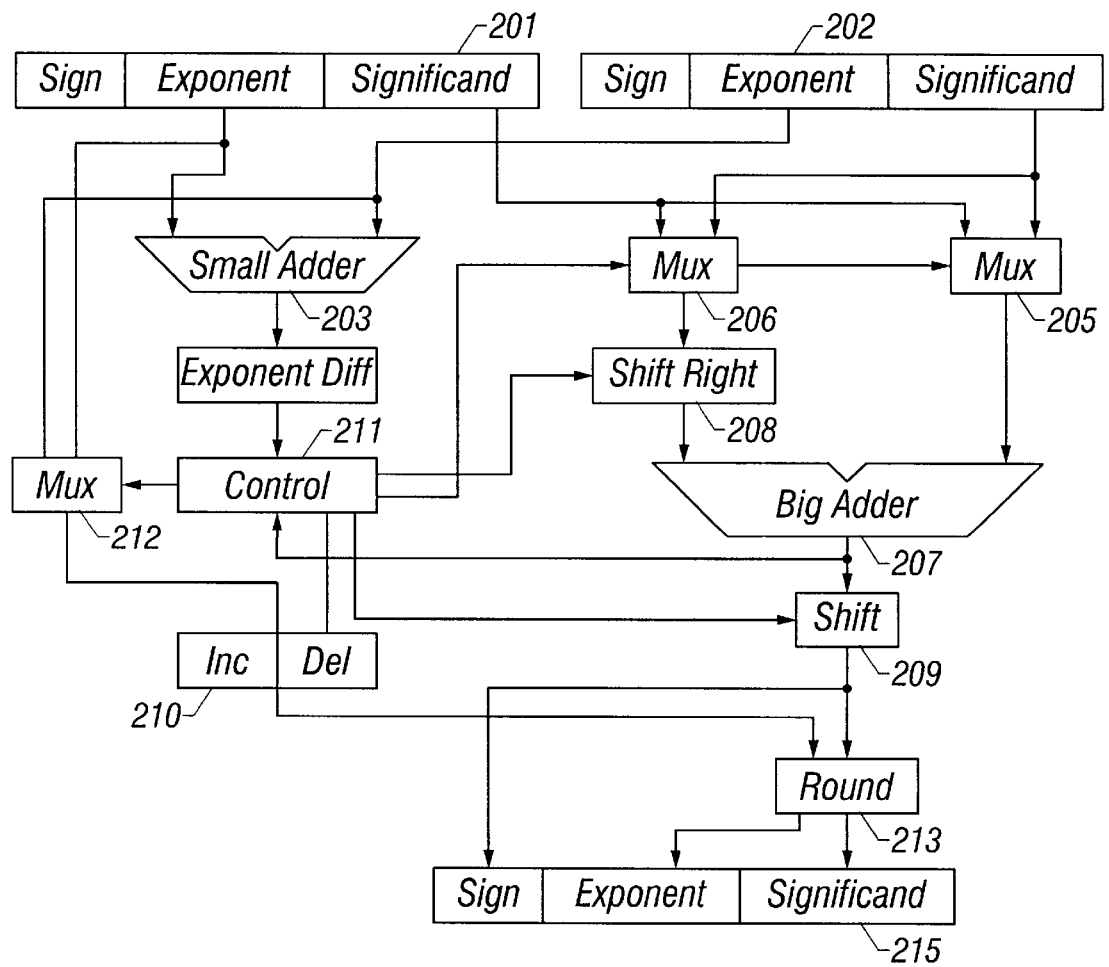
FIG. 2 shows a block diagram of a prior art floating point adder.
Figure 3:
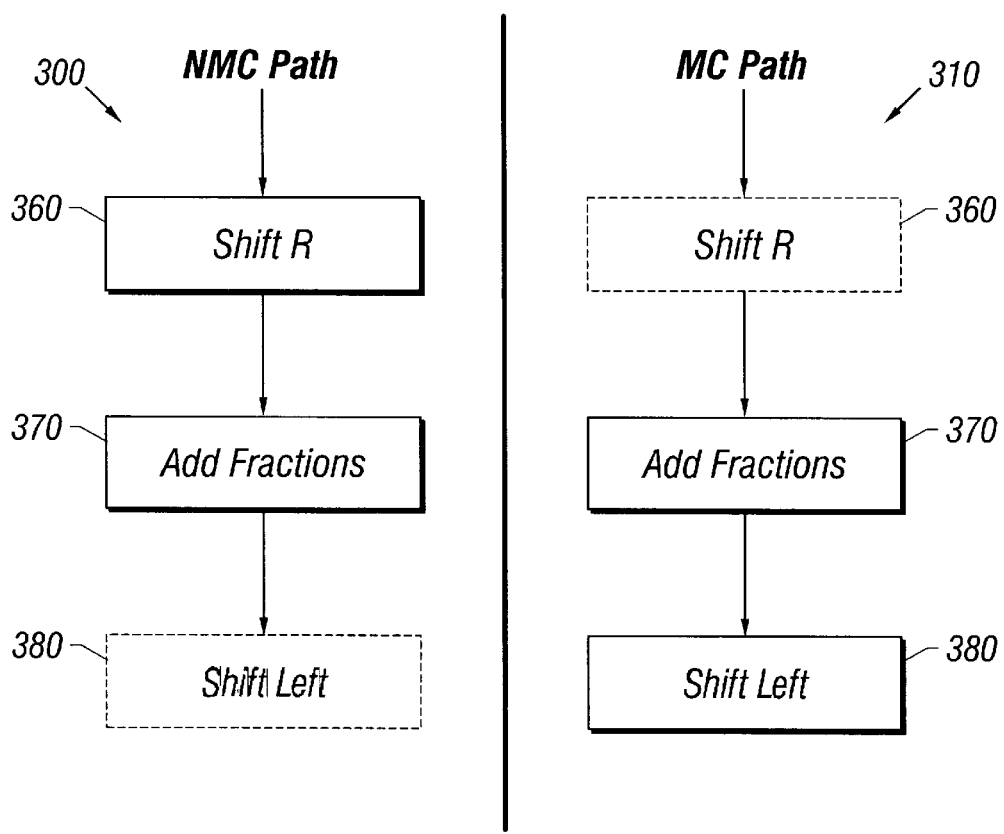
FIG. 3 shows a high level diagram of an MC and NMC path.

In order to exploit the fact that only one large shift operation is required in a floating point subtraction operation, a separate path should be utilized for cases where MC occurs and a separate path utilized for cases where NMC occur. This is illustrated in FIG. 3. The MC data path 310, where |ExpA-ExpB|≦1, consists of addition step 370 and left shift step 380. The first shift step, 360, is unnecessary in the MC path and can be skipped because the maximum shift is only one and can be accomplished without a shifter. The NMC path 300 requires the first shift 360 which is followed by the addition step 370. The final shift step 380 is not needed in the NMC path and can be skipped. Note that Table 1 indicates that MC does not always occur even where the exponent difference is less than or equal to one.

For subtract operations in the MC data path, massive cancellations will occur under certain conditions. The conditions for which massive cancellations will occur can be predicted and the appropriate response to take in the MC data path to take advantage of the MC condition are shown in Table 2.

TABLE 2

| FrcA | FrcB | |ExpA-ExpB| | Shift | Complement |
|---|---|---|---|---|
| 1.00 | 1.1X | 1 | FrcB>>1 | compl FrcB |
| 1.1X | 1.00 | 1 | FrcA>>1 | compl FrcA |
| 1.XX | 1.XX | 0 | no shift | comp FrcB |

Thus, if the exponent difference is 1, and the fraction bits are as shown in Table 2, row 1, where X indicates a don't care, then the proper operation to take is to shift FrcB right by 1 and complement FrcB. The complement operation is performed to facilitate subtraction. This will result in a subtraction operation of (1.00)-(0.11X). In row 2, the specified conditions result in FrcA being shifted by one bit and complemented. Row 3 shows that when the exponents are equal, no shift is required. Note that these are predictions of when MC occurs, but not actual determinations. It is necessary to know which exponent is larger by 1, rather than just the absolute value to fully determine the existence of MC. When the exponents are equal, MC will occur except when FrcA=1.00 and FrcB=1.1X or vice versa, when FrcB=1.00 and FrcA=1.1X. Note, however, that when the exponents are equal the MC path will generate the correct results. Thus, when the results from the MC path are known to be valid, it is appropriate to select those results. It is possible that the particular prediction and verification utilized may result in data being valid in the MC path, even though it is not selected.

The presence or absence of MC can be predicted based on the values of certain bits of the fractions and exponents and it can be shown whether or not the MC path or the NMC path will get the correct result as shown in the following eight cases in Tables 3A–3H. For each case, the best and worst case result is shown. The best case and worst case shows the need for normalization following the subtraction operation in the NMC data path. That is necessary because the NMC path does not have a large shift following the subtraction of the fractions. The results for the MC path are also shown in Tables 3A–3H. The eight cases are shown in Table 3.

TABLE 3

| | | |
|---|---|---|
| Case 1 | FrcA = 1.00 | FrcB = 1.0 |
| Case 2 | FrcA = 1.00 | FrcB = 1.1 |
| Case 3 | FrcA = 1.01 | FrcB = 1.0 |
| Case 4 | FrcA = 1.01 | FrcB = 1.1 |
| Case 5 | FrcA = 1.10 | FrcB = 1.0 |
| Case 6 | FrcA = 1.10 | FrcB = 1.1 |
| Case 7 | FrcA = 1.11 | FrcB = 1.0 |
| Case 8 | FrcA = 1.11 | FrcB = 1.1 |

Referring to Table 3A, for the MC path, when the exponents are equal, no right shift is required to align the exponents, and the subtraction will result in massive cancellations. When the exponents differ by one, then from the first column of Table 3A, showing the NMC case, it is seen that whether FrcA is subtracted from FrcB, or vice versa, the worst case will require a two bit shift to normalize after subtraction while the best case requires a one bit shift.

TABLE 3A

1. FrcA = 1.00XX  FrcB = 1.0XXX

```
NMC data path:              MC data path => exp equal, then
                                            no right shift
    1.00XXX (FrcA)
   -0.10XXX (FrcB)
                                1.00XXX (FrcA)
    0.01XXX (worst case result -1.0XXXX (FrcB)
            when exp differ by 1)  0.00000 (MC)
    0.10XXX (best case result
            when exp differ by 1)
    1.0XXXX (FrcB)
   -0.100XX (FrcA)

0.01XXX (worst case result
            when exp differ by 1)
    0.11XXX (best case result
            when exp differ by 1)
```

TABLE 3B

2. FrcA = 1.00XXX  FrcB = 1.1XXX

```
NMC data path:              MC data path => exp differs by 1,
                                            then right shift FrcB
    1.1XXXX (FrcB)
   -0.100XX (FrcA)
                                1.00XXX (FrcA)
    0.11XXX (worst case result -0.11XXX (FrcB)
            when exp differ by 1)  0.00000 (MC)
    1.01XXX (best case result
            when exp differ by 1)
    1.1XXXX (FrcB)
   -1.00XXX (FrcA)

0.1XXXX (worst case result
            when exp equal)
    0.1XXXX (best case result
            when exp equal)
```

TABLE 3C

3. FrcA = 1.01XXX  FrcB = 1.0XXX

```
NMC data path:              MC data path => exp equal, then
                                            no right shift
    1.01XXX (FrcA)
   -0.10XXX (FrcB)
                                1.01XXX (FrcA)
    0.10XXX (worst case result -1.0XXXX (FrcB)
            when exp differ by 1)  0.00XXX (MC)
    0.11XXX (best case result
            when exp differ by 1)
    1.0XXXX (FrcB)
   -0.101XX (FrcA)

0.01XXX (worst case result
            when exp differ by 1)
    0.11XXX (best case result
            when exp differ by 1)
```

TABLE 3D

4. FrcA = 1.01XX  FrcB = 1.1XXX

```
NMC data path:              MC data path => exp equal, then
                                            no right shift
    1.01XXX (FrcA)
   -0.11XXX (FrcB)
                                1.1XXXX (FrcB)
    0.01XXX (worst case result -1.01XXX (FrcA)
            when exp differ by 1)  0.00XXX (MC)
    0.10XXX (best case result
            when exp differ by 1)
    1.1XXXX (FrcB)
   -0.101XX (FrcA)

0.11XXX (worst case result
            when exp differ by 1
    1.01XXX (best case result
            when exp differ by 1)
```

TABLE 3E

5. FrcA = 1.10XX  FrcB = 1.0XXX

```
NMC data path:              MC data path => exp equal, then
                                            no right shift
    1.10XXX (FrcA)
   -0.10XXX (FrcB)
                                1.10XX (FrcA)
    0.11XXX (worst case result -1.0XXX (FrcB)
            when exp differ by 1)  0.00XXX (MC)
    1.01XXX (FrcB)
   -0.110XX (FrcA)

0.01XXX (worst case result
            when exp differ by 1)
    0.10XXX (best case result
            when exp differ by 1)
FrcB has to be 1.01 else same as FrcB =
00 & FrcA = 1.1, (case 2 shift FrcA)
```

TABLE 3F

6. FrcA = 1.10XXX  FrcB = 1.1XXX

| NMC data path: | MC data path => exp equal then |
|---|---|
| | no right shift |
| 1.10XXX (FrcA) | |
| −0.11XXX (FrcB) | 1.00XXX (FrcA) |
| 0.10XXX (worst case result | −1.1XXXX (FrcB) |
| when exp differ by 1 | 0.00000 (MC) |
| 0.11XXX (best case result | |
| when exp differ by 1 | |
| 1.10XXX (FrcB) | |
| −0.110XX (FrcA) | |
| 0.01XXX (worst case result | |
| when exp differ by 1 | |
| 0.11XXX (best case result | |
| when exp differ by 1 | |

TABLE 3G

7. FrcA = 1.11XX  FrcB = 1.0XXX

| NMC data path: | MC data path => exp equal, then |
|---|---|
| | no right shift |
| 1.11XXX (FrcA) | |
| −0.10XXX (FrcB) | 1.11XXX (FrcA) |
| 1.00XXX (worst case result | −1.0XXX (FrcB) |
| when exp differ by 1) | 0.01XXX (MC) |
| 1.01XXX (best case result | |
| when exp differ by 1) | |
| 1.01XXX (FrcB) | |
| −0.111XX (FrcA) | |
| 0.01XXX (worst case result | |
| when exp differ by 1) | |
| 0.10XXX (best case result | |
| when exp differ by 1) | |
| FrcB has to be 1.01, else same as FrcB = | |
| 1.00 & FrcA = 1.1, (case 2, shift FrcA) | |

TABLE 3H

8. FrcA = 1.11XXX  FrcB = 1.1XXX

| NMC data path | MC data path => exp equal |
|---|---|
| | no right shift |
| 1.11XXX (FrcA) | |
| −0.11XXX (FrcB) | 1.11XXX (FrcA) |
| 0.11XXX (worst case result | −1.1XXXX (FrcB) |
| when exp differ by 1) | 0.001XX (MC) |
| 1.00XXX (best case result | |
| when exp differ by 1) | |
| 1.1XXXX (FrcB) | |
| −0.111XX (FrcA) | |
| 0.10XXX (worst case result | |
| when exp differ by 1) | |
| 1.00XXX (best case result | |
| when exp differ by 1) | |

As can be seen in the Tables 3A–3H, given the most significant two bits of the exponents and whether the two exponents are equal or differ by one can be used to predict when to use the MC path. The least significant bit of each exponent can be XORed together to predict if the exponents are possibly equal or possibly differ by 1. Tables 3A–3H show that in all cases, the NMC path will be able to handle the subtraction with at worst case, a 2 bit shift required following the fraction subtraction. It is important to recognize, that Table 3A–3H give us the ability to predict when the MC cancellation path is appropriate, given three bits from each operand. However, the prediction can be wrong.

This can be seen from Table 3B, for the MC path, for the case where the exponents differ by 1, and frcA=1.00 and FrcB=1.1. It is necessary to determine whether exponent A or exponent B is bigger since all that is known is whether the LSBs are equal or not. Therefore, as seen in Table 3B, the MC path assumes that expA>expB, which results in a right shift and complement of exponent B. Thus, the MC path performs the subtraction of (1.00XXX−0.11XXX), while the correct operation to take, if expB>expA, is to subtract (1.1XXXX−0.100XX). Thus, it is important to determine which exponent is larger to ensure that if the wrong assumption is made in the MC path, that the result from the MC path is not selected.

Because it is necessary to determine whether expA or expB is larger and by how much to determine if the results out of the MC path should be selected, it is necessary to wait on the calculation of the exponent difference to validate the results of the MC path. However, one important feature of the invention is that it is not necessary to wait on the determination of the exponent difference in order to predict MC and thus MC prediction and determination of differences in the fractions can be determined in parallel with the exponent difference determination.

For every case which was not handled by the MC path, the result never requires left shifting more than 2 bits for normalization after summing the significands. This can be built into the rounding logic, thus the NMC data path can be utilized for all cases when the MC path is not. The exponent will also have to be adjusted by 0, −1 or −2, depending on the leading zeroes in the fraction.

The present invention exploits the ability to predict massive cancellation to enhance the efficiency of the adder when the MC path is determined to provide the correct answer. Note that even when the MC path does provide the correct answer, it is not always selected to provide the basis for the fraction result.

Figure 4:
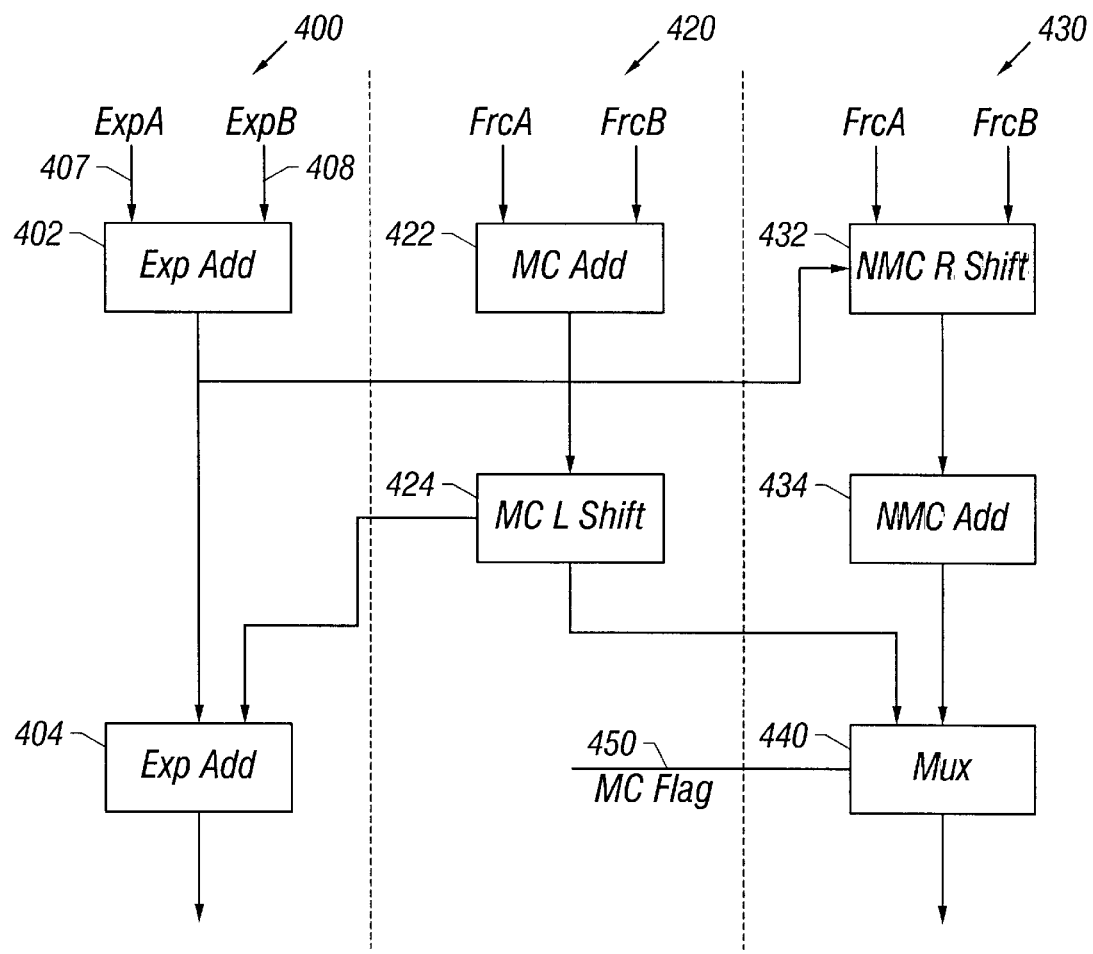
FIG. 4 shows a high level block diagram of the present invention.

Referring to FIG. 4, a simplified block diagram of one embodiment of the present invention is shown. The exponent adder data flow is shown as path 400. Small adder 402 receives the two exponent values and determines the difference between them. This difference is used to right shift the fraction in the NMC path 430. The MC adder 422 adds the fraction A and fraction B, which has been shifted and complemented, according to the MC prediction. For NMC cases, the shifter 432 must wait for the output of the exponent adder 402. However, the MC prediction allows the MC adder to compute the fractional difference concurrently with the determination of the exponent difference. If an MC condition exists, the MC result out of adder 422 is left shifted in left shift logic 424. If the NMC case exists, the right shifted fraction (FrcB) is added to (FrcA) in NMC adder 434. The larger exponent, which is chosen as the result exponent is adjusted in exponent adder 404 according to the result of the MC left shifter 424, which must determine the number of leading 0's. The result of the NMC adder may also require a 2 bit left shift, a 1 bit left shift, no shift, or a one bit right shift. That shift needs to be reflected in the exponent. As shown in FIG. 4, the MC adder path does not wait on the results of the exponent adder 402. Thus, for the MC case the performance of the floating point add operation, has been improved by the delay through the exponent adder 402. That is, the MC data path does not need to wait on the exponent add to start.

Figure 5:
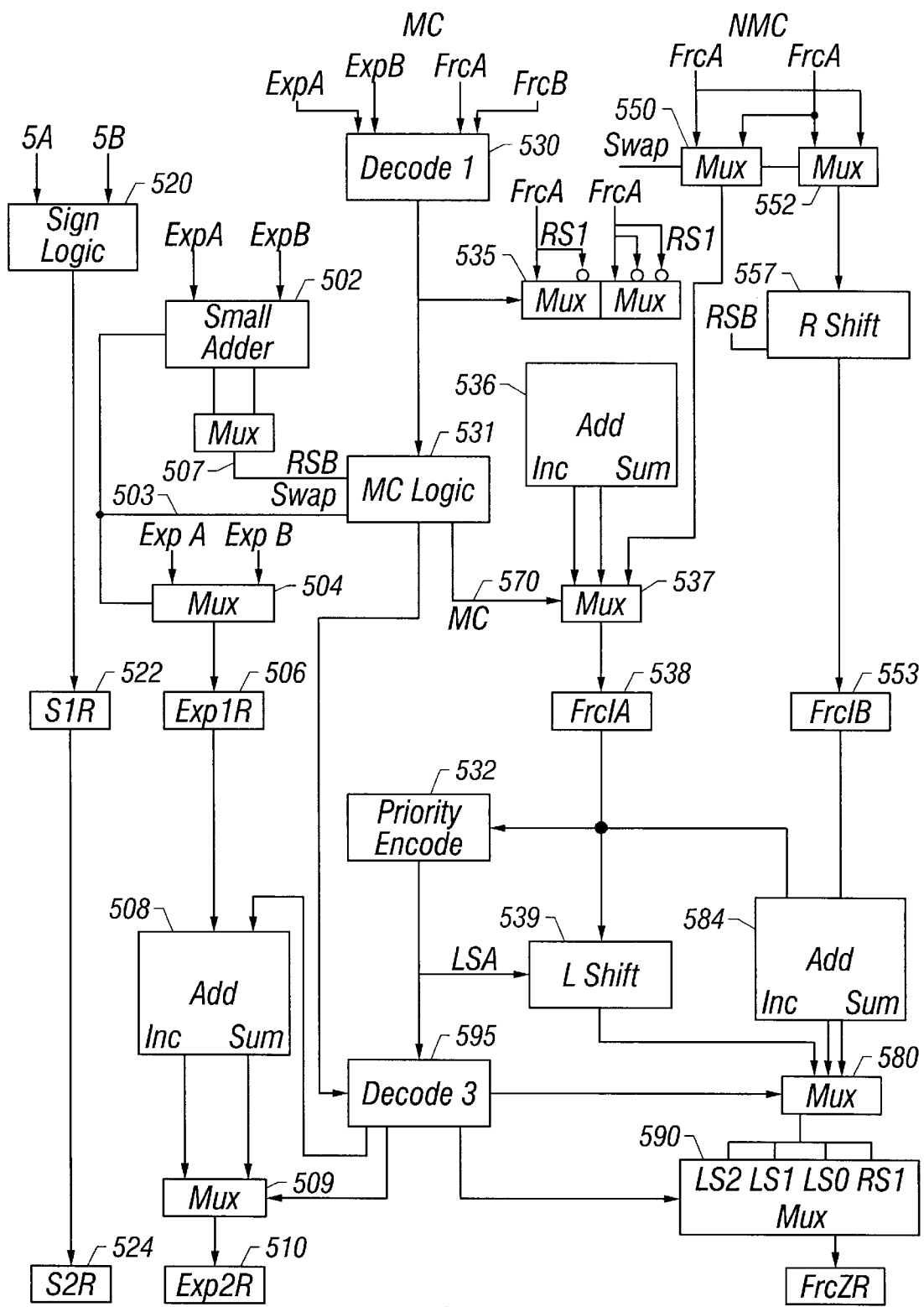
FIG. 5 shows a more detailed block diagram of one embodiment of the invention.

The advantages of the invention can be seen more clearly by referring to FIG. 5. FIG. 5 presents a more detailed block diagram of one embodiment of the present invention which will add/subtract A+B or A−B. The exponent data path includes adder 502, multiplexer 504, first exponent pipeline register 506, adder 508 and second exponent pipeline register 510. The adder 502 determines the difference between the two exponents and outputs the right shift B (RSB) signal 507 |ExpA−ExpB| and the swap fractions (SWAP) signal 503, indicating that ExpB>ExpA. The details of computing the exponent difference and determining a zero detect simultaneously can be found in U.S. Pat. No. 5,835,389 and pending U.S. patent application Ser. No. 08/695,142 respectively entitled "Calculating the Absolute Difference of Two Integer Numbers in a Single Instruction Cycle" and "Zero Detect for Binary Difference" which are assigned to the same assignee as the present invention and which are incorporated herein by reference.

Sign logic 520 determines the sign result for A+B or A−B. Two pipeline registers 522 and 524 store the result of the sign determination. The sign logic requires input (not shown) in case there is a negative result from adder 536, i.e., where the exponents are equal and FrcB, which was negated, is larger than FrcA.

The massive cancellation data flow includes decoder logic 530 which receives the least significant bit from each of the exponents. The decoder also receives the two most significant bits (MSBs) of the two fractions. Using these bits, the decoder determines when the exponents are possibly equal, and whether the two MSBs are such that massive cancellation will occur in accordance with tables 3A–3H.

The decoder 530 is used to predict MC conditions and to control the shifting and complementing of the fraction bits provided to MC adder 536. The results from adder 536 are provided through multiplexer 537 to pipeline register 538. The results from pipeline register 538 are provided to priority encoder 532, which determines the normalization required for the fractional result. The normalization requirements are provided to exponent adder 508 through decoder 595 in order to adjust the exponent in accordance with the normalization.

Figure 6:
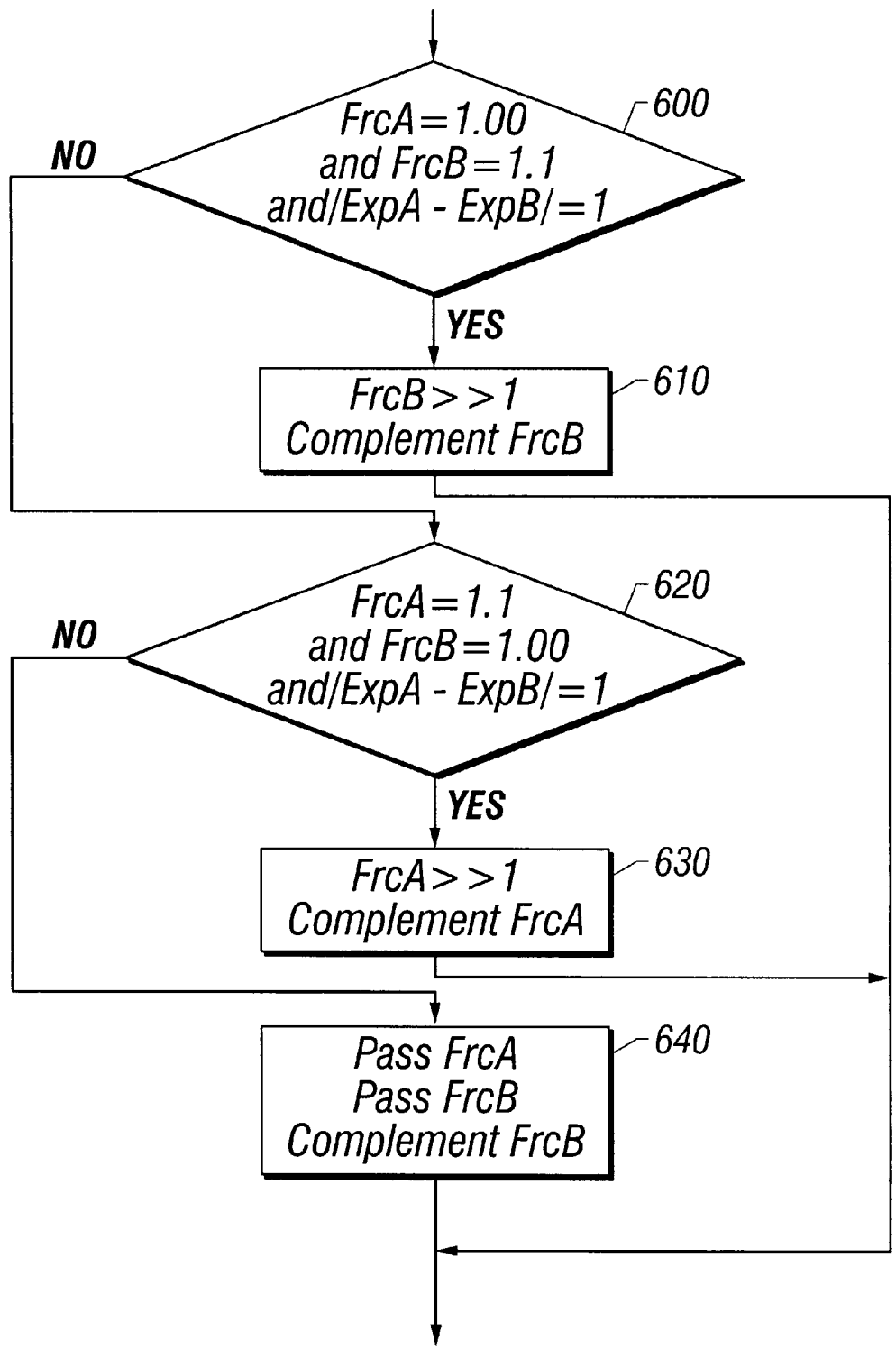
FIG. 6 shows the decode for MC prediction in the MC path.

A flow chart of the function of the decoder 530 shown in FIG. 6. Depending on the value of the exponent LSBs and the fraction MSBs, one of the fractions will be complemented when the exponents are equal, or one of the fractions shifted to the right one by one bit and complemented. The decoder determines in step 600 a first possible MC condition, FrcA=1.00, FrcB=1.1X, and |ExpA−ExpB|=1. Note that the absolute value prediction can be performed in an XOR gate since only one bit is being compared. If |Exp A−Exp B|=1, the decoder in step 610 will control the muxes to send right shifted and complemented FrcB to adder 536. Thus, the decoder is assuming that B is the smaller number. As previously described, that assumption may be incorrect in which case the MC path will provide an incorrect answer.

The decoder determines in step 620 another possible MC condition, FrcB=1.00, FrcA=1.1X, and |ExpA−ExpB|=1. If that condition exists, the decoder in 630 will control the muxes to send right shifted and complemented FrcA to the adder 536. Thus, the decoder is assuming that A is the smaller number. That assumption may be incorrect in which case the MC path will provide an incorrect answer.

Finally, the decoder will otherwise pass both FrcA and FrcB without shifting, and will complement FrcB. In other words, |FrcA−FrcB=0. It would also be possible to complement FrcA in such cases.

Although the decoder for the MC mux 535 and adder 536 predict MC cases, every prediction it makes will not result in valid MC data. However, the MC adder 536 can determine the result of FrcA−FrcB or FrcB−FrcA at the same time that the exponent adder 502 determines the difference between the exponent A and exponent B. In cases where the decoder predicted correctly, the correct result will be available. In cases where the MC prediction was incorrect, the NMC path can handle the subtraction with no penalty for having attempted the MC path.

The NMC path is illustrated in FIG. 5. The FrcA and FrcB are input into muxes 550 and 552. The mux select (SWAPF) 503, is an output from the exponent adder 502 which indicates whether expB>ExpA. If so, the fraction of the smaller number is input into right shifter 557. The right shifter is controlled by the right shift B (RSB) signal 503 from adder 502. The RSB signal is the |ExpA−ExpB| and indicates to the shifter how many bits the fraction of the smaller number has to be right shifted to account for equalizing the exponents. Unlike the MC data path, the NMC data path has to wait for the determination of the difference of the exponents. Following the right shift in 557, the right shifted fraction is stored in pipeline register 553 and the unshifted fraction is stored in pipeline register 538. Note that in the embodiment in FIG. 5, the pipeline register 538 is shared by the MC and the NMC path. The mux 537 feeding pipeline register 538 is controlled by the MC signal 570 which indicates whether the MC prediction was correct and determined whether the MC path or the NMC path is taken. This multiplexer can be eliminated if an additional register is provided. In the NMC case, the two fractional numbers from the NMC path are subtracted in adder 584 and provided to mux 580. The results are provided to decoder 595 (decode 3) to control exponent adjustment, if any, as a result of the subtraction and to provide appropriate shift control to multiplexer 590.

The present invention, therefore, provides a faster path through the adder for floating point subtraction operations described herein. That can be seen by realizing that the worst case delay to the pipeline register 538 is the delay through small adder 502 plus the delay through the right shifter 552 or the delay through the MC path, adder 536. If the subtraction in the MC path was not started simultaneously with the exponent difference determination, then the worse case delay would be the delay through small adder 502 plus the delay through adder 536. Thus, the improvement lies in eliminating the delay path through small adder 502 and MC adder 536 which is longer than the delay of small adder 502 and shifter 552. The delay through MC adder 536 is longer than the delay of either small adder 502 (because small adder 502 is smaller) or the shifter 557. Thus, decoupling MC adder 536 from the small adder 502 improves the worst case.

Figure 7:
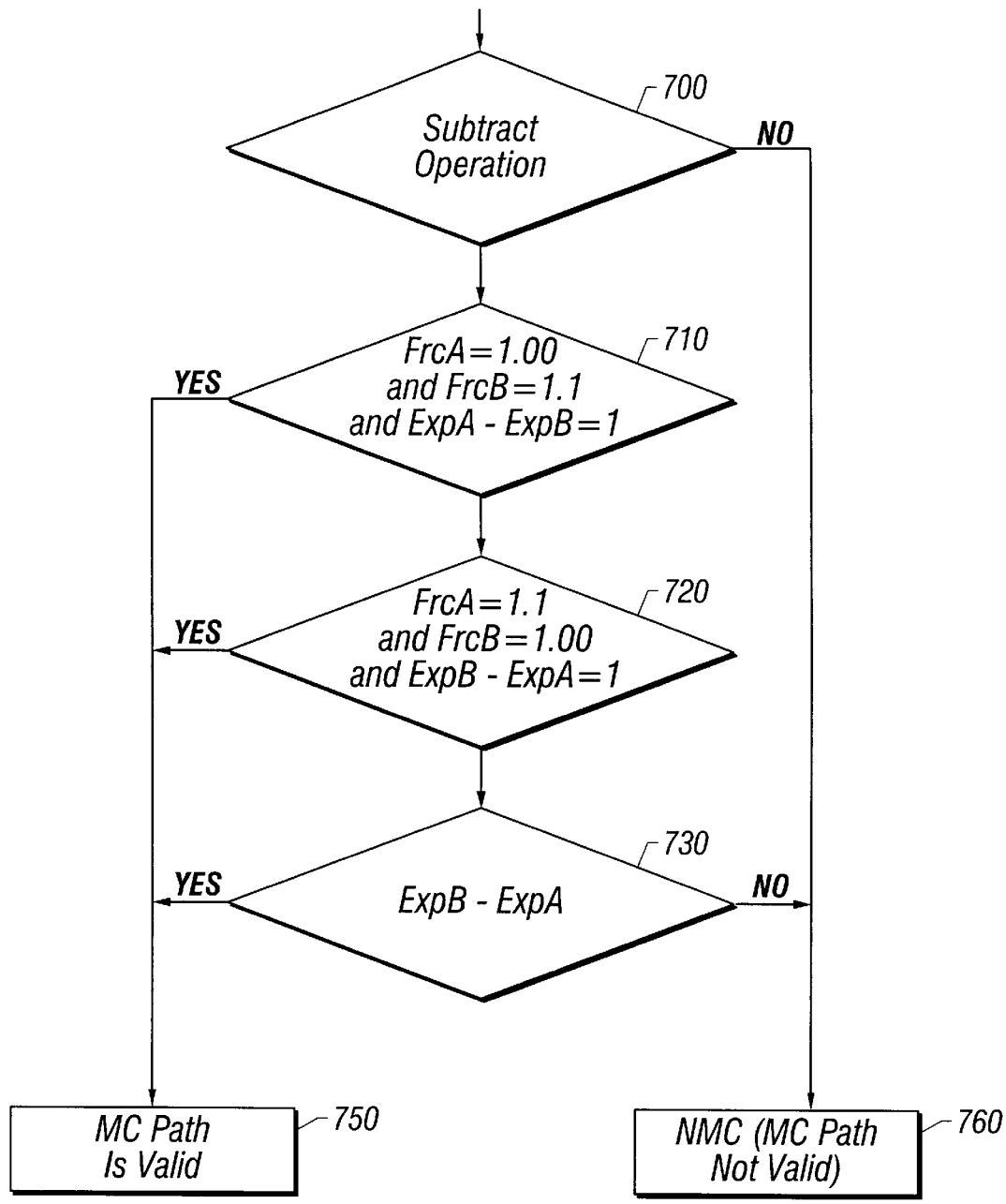
FIG. 7 shows the steps for MC computation.
Figure 8A:
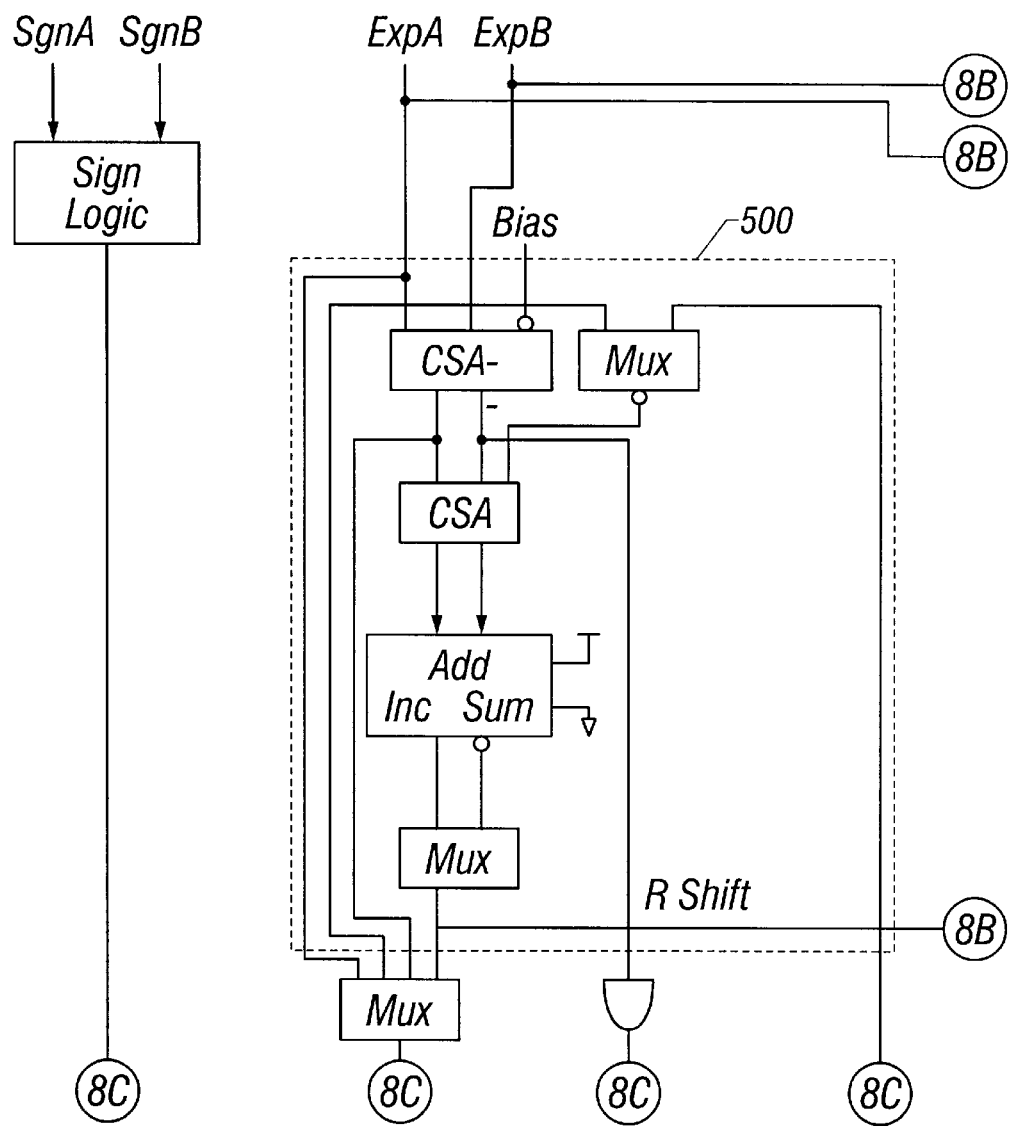
FIG. 8 shows further details of the embodiment shown in FIG. 5.
Figure 8B:
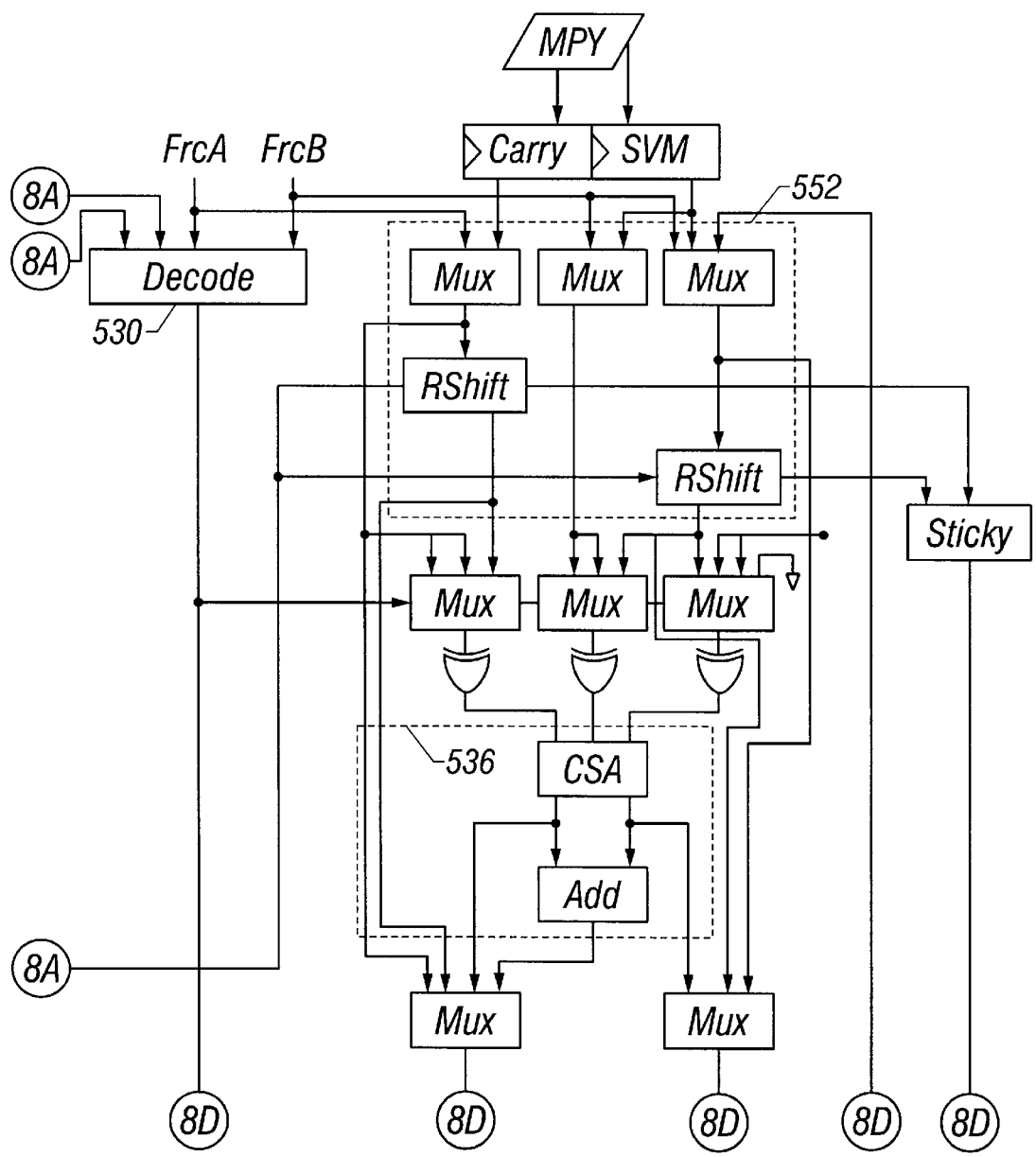
Figure 8C:
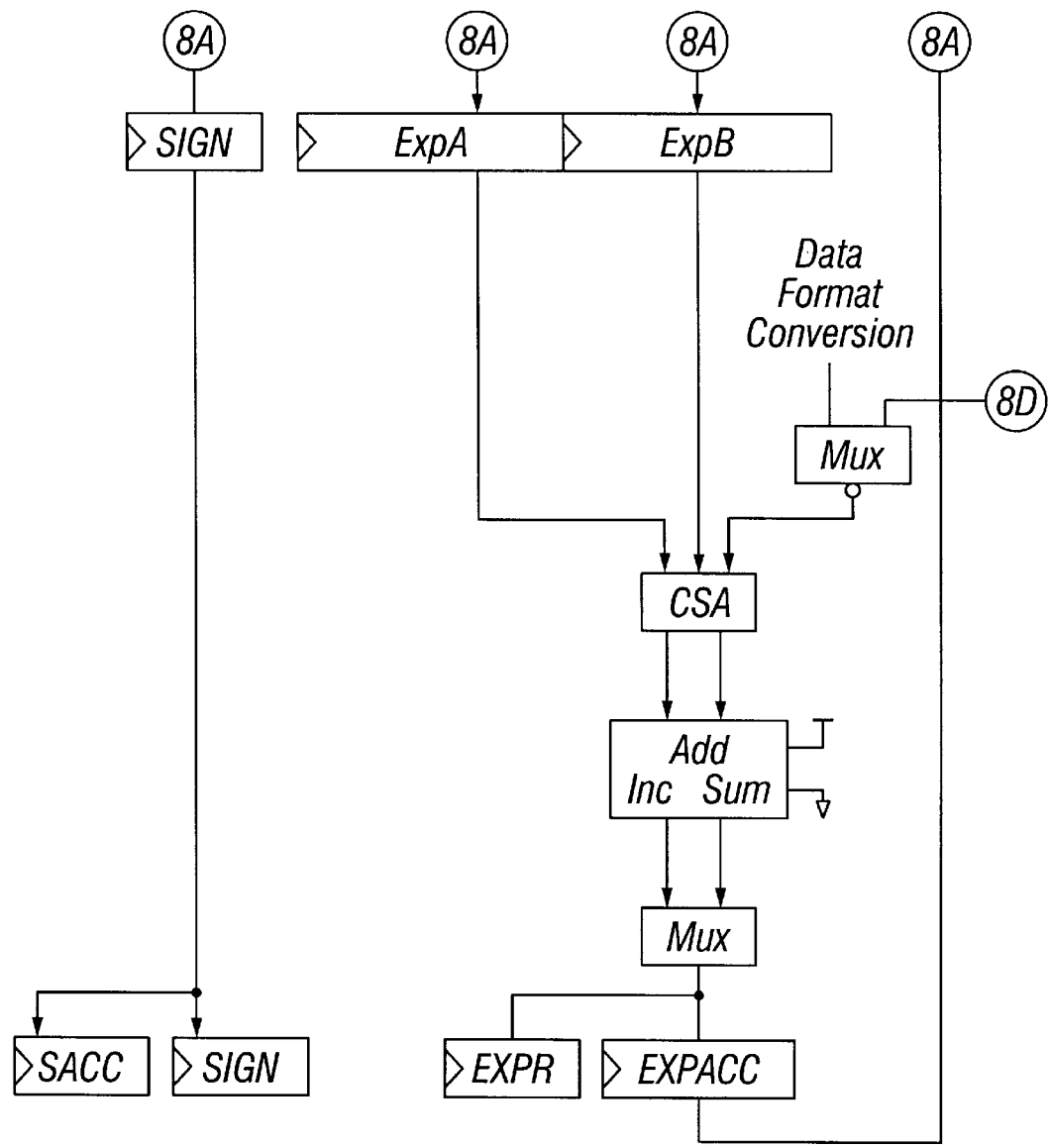
Figure 8D:
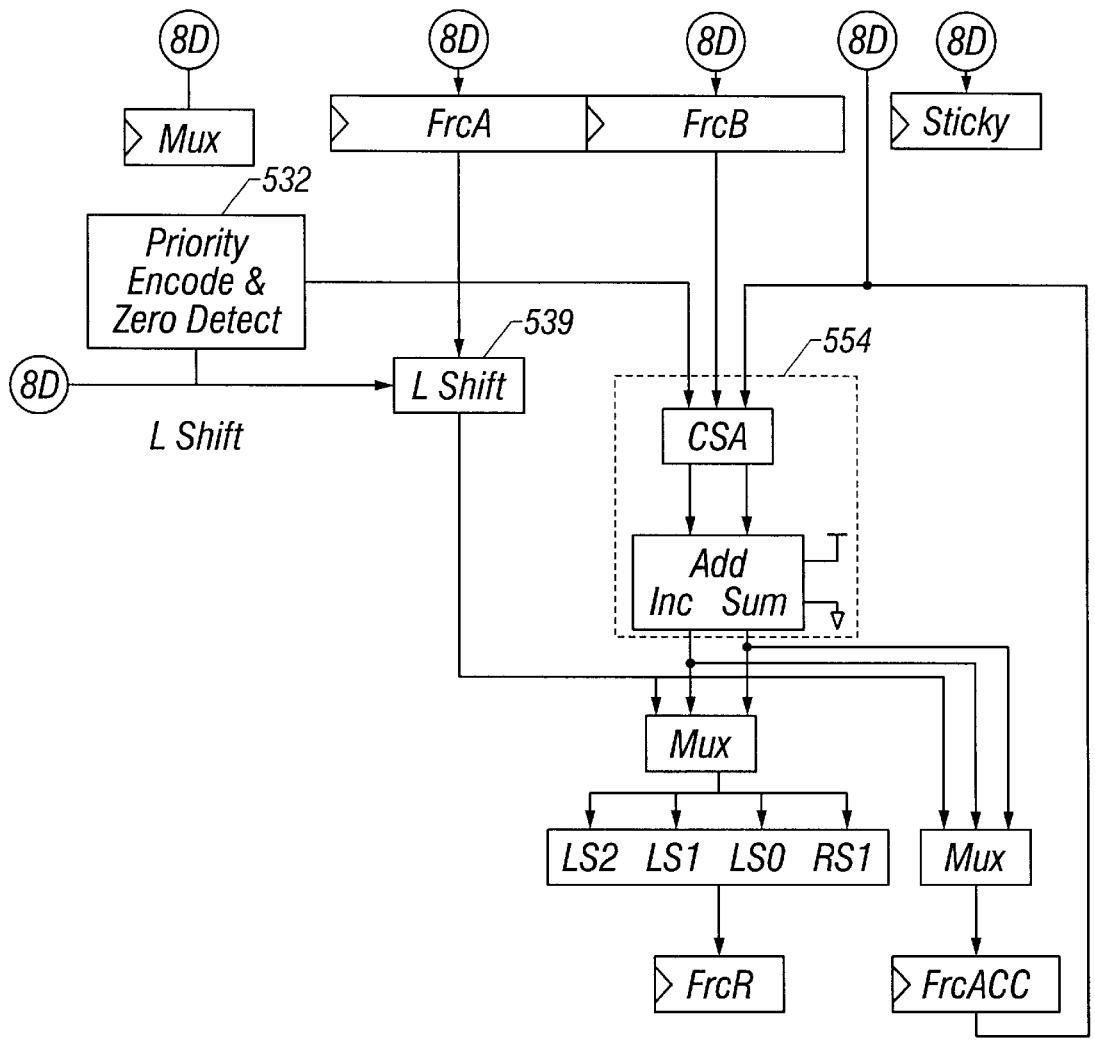

Remembering that the existence of massive cancellation prediction in decoder 530 was sufficient only to ensure that in MC cases, the result from adder 536 was correct, massive cancellation must be computed for each subtraction in order to correctly select the output of the NMC path or the MC path as the basis for the final result. MC Logic 531 receives RSB signal 507, swap fractions signal 503, and output signals from decoder 530, and utilizes the signals to determine whether the massive cancellation path result is valid as shown in the flowchart in FIG. 7. Step 700 determines the existence of a subtract operation. A subtract operation for the purposes of the instant invention includes a subtract operation when the signs of the operands are the same and an addition operation when the signs of the operands are different. Step 710 determines if FrcA=1.00 and FrcB=1.1 and ExpA−ExpB=1. If so, MC flag 570 is set in step 750, i.e., the MC path is determined valid. If not step 720 determines if FrcB=1.00 and FrcA=1.1 and ExpB−ExpA=1. If these conditions exists that the MC flag 570 is set in 750. Finally if the exponents are equal, then the MC flag is set in 750. If one of these three conditions does not exist, the NMC path is chosen, i.e., the MC path is determined to be not valid.

One difference between the prediction and the computation is that computation, unlike the prediction, requires knowing whether expA=expB, whether expB−ExpA=1 or ExpA−ExpB=1. The combination of the SWAP signal 503 which indicates if ExpB>expA and RSB 507, which is the absolute value of expA−expB can be used to determine if expA−expB=1, 0, −1.

FIG. 8 shows further details of the data flow in one embodiment of the invention. Those elements corresponding to elements shown in FIG. 5 are identified by the same reference numbers. FIG. 8 shows additional details of, e.g., adders 502, 536 and 554. Note that certain features detailed in FIG. 8, e.g., the carry sum registers fed from multiplier MPY are details not within the scope of this invention.

The description of the invention set forth herein is illustrative, and is not intended to limit the scope of the invention as set forth in the following claims. Variations and modifications of the embodiments disclosed herein, may be made based on the description set forth herein, without departing from the scope and spirit of the invention as set forth in the following claims.

What is claimed is:

1. A method of performing a floating point subtraction on a first and second floating point number to obtain an exponent result and a fraction result, the first floating point number having a first exponent and a first fraction and the second floating point number having a second exponent and a second fraction, the method comprising the steps of:

determining an exponent difference between the first and second exponent in a first adder;

concurrently with determining the exponent difference, determining a massive cancellation prediction in a prediction circuit, the massive cancellation prediction providing shift and complement indications for the first and second fractions based at least partially on whether the absolute value of the difference between the first and second exponent is equal to a predetermined value, and receiving the first and second fractions in accordance with the prediction and beginning determination of the difference between the received first and second fractions in a second adder to generate a massive cancellation fraction result;

determining whether the massive cancellation result is valid; and selecting the massive cancellation fraction result as a basis for the fraction result when the massive cancellation result is determined valid.

2. A method as recited in claim 1 wherein the step of determining the massive cancellation prediction further comprises:

providing at least one bit of each of the first and second exponents to the prediction circuit; and providing at least two bits of each of the first and second fractions to the prediction circuit.

3. A method as recited in claim 2 wherein, the one bit of the first and second exponents provided to the prediction circuit is the least significant bit; and the two bits of the first and second fractions provided to the prediction circuit are the two most significant bits (MSBs).

4. A method as recited in claim 3, wherein the step of determining the massive cancellation prediction further comprises:

bit complementing one of the first and second fractions when the one bit of the first exponent equals the one bit of the second exponent;

right shifting the second fraction by one bit and bit complementing the right shifted second fraction when the one bit of the first exponent is not equal to the one bit of the second exponent, and the two bits of the first fraction are 00 and the MSB of the second fraction is 1; and right shifting the first fraction by one bit and complementing the right shifted first fraction when the one bit of the first exponent is not equal to the one bit of the second exponent, and the two bits of the second fraction are 00 and the MSB of the first fraction is 1.

5. The method as recited in claim 4 wherein the step of determining whether the massive cancellation result is valid, comprises the steps of:

(a) determining that the massive cancellation fraction result is valid when the first exponent equals the second exponent;

(b) determining that the massive cancellation fraction result is valid when the first exponent minus the second exponent is one, and the two bits of the first fraction are 00 and the MSB of the second fraction is 1;

(c) determining that the massive cancellation fraction result is valid when the second exponent minus the first exponent is one, and the two bits of the second fraction are 00 and the MSB of the first fraction is 1; and (d) determining that the massive cancellation result is not valid if the massive cancellation result is not determined to be valid in any of steps (a), (b) and (c).

6. The method according to claim 5 further comprising the steps of:

shifting one of the first and second fractions in a right shifter by an amount determined by the exponent difference, to generate a right shifted and unshifted fraction;

adding the right shifted fraction to the unshifted fraction to generate a no massive cancellation fraction result; and selecting the no massive cancellation fraction result as the basis for the fraction result when the massive cancellation fraction result is not determined valid.

7. The method according to claim 6 further comprising shifting the no massive cancellation result by no more than two bits.

8. A method of performing a floating point subtraction on two floating point numbers, the method comprising the steps of:

determining an exponent difference between the two floating point numbers in a first adder;

before completion of the determination of the exponent difference, beginning determining both a first fraction difference between the two floating point numbers in a second adder and a massive cancellation prediction in a decoder based at least partially on whether the absolute value of the difference between the first and second exponent is equal to a predetermined value;

determining a second fraction difference in a third adder between the two floating point numbers after determining the exponent difference; and selecting one of the first fraction difference and the second fraction difference according to the exponent difference and the massive cancellation prediction.

9. An apparatus for performing a floating point subtraction of a first and a second number, the first and second numbers respectively including a first and second exponent and a first and second fraction, the apparatus comprising:

a first adder receiving the first and second exponents and outputting an exponent difference;

a massive cancellation prediction circuit, coupled to predetermined bits of the first and second numbers, outputting a massive cancellation prediction indication, the massive cancellation prediction indication being based at least partially on whether the absolute value of the difference between the first and second exponent is equal to a predetermined value;

a second adder circuit coupled to the prediction circuit and receiving the first and second fractions in accordance with the prediction indication, the second adder subtracting the first and second fractions and outputting a massive cancellation fraction result; and a massive cancellation determination circuit, outputting a massive cancellation signal indicating when the massive cancellation fraction result is valid in accordance with the predetermined bits of the first and second numbers and the exponent difference.

10. An apparatus according to claim 9 wherein the first adder outputs a swap signal if the second exponent is larger than the first exponent.

11. An apparatus according to claim 10, further comprising:

a swap selector circuit, receiving the first and second fractions and outputting one of the first and second fractions as a no massive cancellation (NMC) second fraction according to the swap signal;

a first shift circuit receiving the NMC second fraction, the first shift circuit shifting the NMC second fraction according to the exponent difference; and a third adder coupled to the NMC first and second fractions and outputting an NMC fraction result.

12. An apparatus as recited in claim 11, further comprising:

a normalization circuit receiving the massive cancellation fraction result, the normalization circuit determining an amount to shift the massive cancellation fraction result and outputting a normalized massive cancellation fraction result; and an output selector circuit outputting one of the normalized massive cancellation fraction result and the no massive cancellation fraction result according to the massive cancellation signal.

13. An apparatus as recited in claim 12, further comprising:

a first selector circuit coupled to the prediction circuit and to the first and second fractions, the first selector circuit selecting for a first fraction output, one of the first fraction and the first fraction complemented and shifted by one bit, the shifter circuit selecting for a second fraction output one of the second fraction, a complement of the second fraction, and the second fraction complemented and shifted by one bit, the first selector circuit selecting the first and second fraction outputs according to the massive cancellation prediction.

14. An apparatus according to claim 12, wherein the massive cancellation prediction circuit receives the least significant bit (LSB) of the first and second exponents and the two most significant bits of the first and second fractions.

15. An apparatus according to claim 14, wherein the prediction circuit further comprises:

a decoder outputting control signals to the first selector circuit indicating to the first selector circuit to select as the first fraction output the first fraction and to select as the second fraction output the complement of the second fraction when the LSB of the first exponent equals the LSB of the second exponent;

the decoder outputting control signals to the first selector circuit indicating to the first selector circuit to select as the first fraction output the first fraction and to select as the second fraction output the second fraction complemented and shifted by one bit, when the LSB of the first exponent is not equal to the LSB of the second exponent and the two bits of the first fraction are 00 and the most significant bit of the second fraction is 1; and the decoder outputting control signals to the first selector circuit indicating to the first selector circuit to select as the first fraction output the first fraction shifted by one bit and complemented and to select as the second fraction output the second fraction, when the LSB of the first exponent is not equal to the LSB of the second exponent and the two bits of the second fraction are 00 and the most significant bit of the first fraction is 1.

16. An apparatus according to claim 9, wherein the massive cancellation determination circuit asserts a massive cancellation flag indicating that the massive cancellation fraction result is valid when the first exponent equals the second exponent and when the first exponent minus the second exponent is one, and the two most significant bits of the first fraction are 00 and the most significant bit of the first fraction is 1 and when the second exponent minus the first exponent is one, and the two most significant bits of the second fraction are 00 and the most significant bit of the first fraction is 1 and otherwise deasserts the massive cancellation flag.

17. An apparatus for performing a floating point subtraction of a first and a second number, the first and second numbers respectively including a first and second exponent and a first and second fraction, the apparatus comprising:

a first adder receiving the first and second exponents and outputting an exponent difference;

a massive cancellation path, the massive cancellation path including;

a massive cancellation prediction circuit, coupled to predetermined bits of the first and second numbers, and outputting a massive cancellation prediction, the prediction providing shift and complement indications for the first and second fractions, the prediction being based at least partially on whether the absolute value of the difference between the first and second exponent is equal to a predetermined value, a second adder circuit coupled to the prediction circuit and receiving the first and second fractions in accordance with the prediction indication, the second adder subtracting the first and second fractions according to the prediction indication and outputting a massive cancellation fraction result, and a massive cancellation determination circuit, outputting a massive cancellation signal indicating when the massive cancellation fraction result is valid a no massive cancellation path, including:
- a shifter receiving one of the first and second fractions and outputting a shifted fraction in accordance with the exponent difference;
- a third adder circuit coupled to the shifter and another of the first and second fracitons not received by the shifter, and outputting a non massive cancellation path result; and
- a selector circuit selecting one of the non massive cancellation path result and the massive cancellation path result according to the massive cancellation signal.

18. The apparatus as recited in claim 17 wherein the means for determining if the massive cancellation result is valid includes means for determining if the seven MSB's of the exponent are equal.

* * * * *